US010247027B2

United States Patent
Rioux et al.

(10) Patent No.: US 10,247,027 B2
(45) Date of Patent: Apr. 2, 2019

(54) OUTER AIRSEAL INSULATED RUB STRIP

(71) Applicant: United Technologies Corporation, Farmington, CT (US)

(72) Inventors: Philip R. Rioux, North Berwick, ME (US); Nicholas R Leslie, South Berwick, ME (US); Paul M. Lutjen, Kennebunkport, ME (US); Christopher W. Strock, Kennebunk, ME (US)

(73) Assignee: United Technologies Corporation, Farmington, CT (US)

( * ) Notice: Subject to any disclaimer, the term of this patent is extended or adjusted under 35 U.S.C. 154(b) by 387 days.

(21) Appl. No.: 15/078,978

(22) Filed: Mar. 23, 2016

(65) Prior Publication Data

US 2017/0276007 A1 Sep. 28, 2017

(51) Int. Cl.
*F01D 5/28* (2006.01)
*F01D 11/12* (2006.01)
(Continued)

(52) U.S. Cl.
CPC .............. *F01D 11/122* (2013.01); *F01D 5/28* (2013.01); *F01D 25/005* (2013.01); *F04D 29/164* (2013.01); *F04D 29/324* (2013.01); *F04D 29/526* (2013.01); *F16J 15/44* (2013.01); *F16J 15/445* (2013.01); *F05D 2220/32* (2013.01); *F05D 2230/31* (2013.01); *F05D 2240/11* (2013.01); *F05D 2240/30* (2013.01); *F05D 2240/55* (2013.01); *F05D 2300/175* (2013.01); *F05D 2300/20* (2013.01); *F05D 2300/6032* (2013.01); *Y02T 50/672* (2013.01)

(58) Field of Classification Search
CPC ........ F01D 11/122; F01D 5/28; F01D 25/005; F04D 29/324; F16J 15/44; F05D 2220/32; F05D 2230/31; F05D 2240/30; F05D 2240/55; F05D 2300/20; F05D 2300/175
See application file for complete search history.

(56) References Cited

U.S. PATENT DOCUMENTS

| 3,519,282 A | 7/1970 | Davis |
| 3,879,831 A | 4/1975 | Rigney et al. |

(Continued)

FOREIGN PATENT DOCUMENTS

| EP | 1013782 A1 | 6/2000 |
| EP | 2574727 A1 | 4/2013 |

(Continued)

OTHER PUBLICATIONS

European Search Report dated Dec. 5, 2017 for European Patent Application No. 17162685.6.

*Primary Examiner* — Igor Kershteyn
(74) *Attorney, Agent, or Firm* — Bachman & LaPointe, P.C.

(57) ABSTRACT

A blade outer airseal has a body comprising: an inner diameter (ID) surface; an outer diameter (OD) surface; a leading end; and a trailing end. The airseal body has a metallic substrate and a coating system atop the substrate along at least a portion of the inner diameter surface. At least over a first area of the inner diameter surface, the coating system comprises an abradable layer and a thermal barrier layer between the abradable layer and the substrate; and the thermal barrier layer comprises a ceramic and metallic phases within the ceramic.

20 Claims, 6 Drawing Sheets

(51) Int. Cl.
*F01D 25/00* (2006.01)
*F04D 29/32* (2006.01)
*F16J 15/44* (2006.01)
*F04D 29/16* (2006.01)
*F04D 29/52* (2006.01)

(56) References Cited

U.S. PATENT DOCUMENTS

| | | | |
|---|---|---|---|
| 4,422,648 A * | 12/1983 | Eaton | F01D 11/12 |
| | | | 277/415 |
| 4,744,725 A | 5/1988 | Matarese et al. | |
| 5,976,695 A | 11/1999 | Hajmrle et al. | |
| 6,533,285 B2 | 3/2003 | Nava et al. | |
| 6,969,231 B2 | 11/2005 | Ghasripoor et al. | |
| 8,650,753 B2 | 2/2014 | Sellars et al. | |
| 8,777,562 B2 | 7/2014 | Strock et al. | |
| 2007/0205189 A1 | 9/2007 | Grossklaus, Jr. et al. | |
| 2010/0080984 A1 * | 4/2010 | Lee | C04B 35/16 |
| | | | 428/334 |
| 2010/0129636 A1 * | 5/2010 | Cybulsky | C04B 41/009 |
| | | | 428/310.5 |
| 2010/0136349 A1 * | 6/2010 | Lee | C04B 41/009 |
| | | | 428/446 |
| 2011/0033630 A1 * | 2/2011 | Naik | C04B 41/52 |
| | | | 427/452 |
| 2012/0189434 A1 | 7/2012 | Strock et al. | |
| 2013/0078085 A1 * | 3/2013 | Strock | F01D 11/122 |
| | | | 415/173.4 |

FOREIGN PATENT DOCUMENTS

| | | |
|---|---|---|
| GB | 2121884 A | 1/1984 |
| GB | 2317899 A | 4/1998 |
| WO | 2015/050704 A1 | 4/2015 |

* cited by examiner

OUTER AIRSEAL INSULATED RUB STRIP

BACKGROUND

This disclosure relates to a gas turbine engine, and more particularly to gaspath leakage seals for gas turbine engines.

Gas turbine engines, such as those used to power modern commercial and military aircraft, generally include one or more compressor sections to pressurize an airflow, a combustor section for burning hydrocarbon fuel in the presence of the pressurized air, and one or more turbine sections to extract energy from the resultant combustion gases. The airflow flows along a gaspath through the gas turbine engine.

The gas turbine engine includes a plurality of rotors arranged along an axis of rotation of the gas turbine engine. The rotors are positioned in a case, with the rotors and case having designed clearances between the case and tips of rotor blades of the rotors. It is desired to maintain the clearances within a selected range during operation of the gas turbine engine as deviation from the selected range can have a negative effect on gas turbine engine performance. For each blade stage, the case typically includes an outer airseal located in the case immediately outboard (radially) of the blade tips to aid in maintaining the clearances within the selected range.

Within the compressor section(s), temperature typically progressively increases from upstream to downstream along the gaspath. Particularly, in relatively downstream stages, heating of the airseals becomes a problem. U.S. patent application Ser. No. 14/947,494, of Leslie et al., entitled "Outer Airseal for Gas Turbine Engine", and filed Nov. 20, 2015 ('494 application), the disclosure of which is incorporated by reference in its entirety herein as if set forth at length, discusses several problems associated with heat transfer to outer airseals and several solutions.

The airseal typically has an abradable coating along its inner diameter (ID) surface. In relatively downstream stages of the compressor where the blades have nickel-based superalloy substrates, the abradable coating material may be applied to a bondcoat along the metallic substrate of the outer airseal. For relatively upstream sections where the compressor blades comprise titanium-based substrates (a potential source of fire) systems have been proposed with a fire-resistant thermal barrier layer intervening between the bondcoat and the abradable material. An example of such a coating is found in U.S. Pat. No. 8,777,562 of Strock et al., issued Jul. 15, 2014 and entitled "Blade Air Seal with Integral Barrier".

SUMMARY

One aspect of the disclosure involves a blade outer airseal having a body comprising: an inner diameter (ID) surface; an outer diameter (OD) surface; a leading end; and a trailing end. The airseal body has a metallic substrate and a coating system atop the substrate along at least a portion of the inner diameter surface. At least over a first area of the inner diameter surface, the coating system comprises an abradable layer and a thermal barrier layer between the abradable layer and the substrate; and the thermal barrier layer comprises a ceramic and metallic phases within the ceramic.

A further embodiment may additionally and/or alternatively include the abradable layer comprising a metal matrix and a solid lubricant.

A further embodiment may additionally and/or alternatively include the abradable layer comprising a metal phase volumetric content greater than a metal phase volumetric content of the thermal barrier layer.

A further embodiment may additionally and/or alternatively include: the abradable layer comprising a metal matrix of a first alloy; and the thermal barrier layer metallic phases are of the first alloy.

A further embodiment may additionally and/or alternatively include the abradable layer having a lower strength than the thermal barrier layer.

A further embodiment may additionally and/or alternatively include the abradable layer having a greater thickness than the thermal barrier layer.

A further embodiment may additionally and/or alternatively include, over a span of the abradable layer, a relative thickness of the abradable layer to the thermal barrier layer decreasing from fore to aft.

A further embodiment may additionally and/or alternatively include the thermal barrier layer having a stepwise thickness increase.

A further embodiment may additionally and/or alternatively include the thermal barrier layer having a higher volumetric ceramic content than a does the abradable layer, if any.

A further embodiment may additionally and/or alternatively include the thermal barrier layer extending axially beyond the abradable layer.

A further embodiment may additionally and/or alternatively include one or more of: the coating system having a bondcoat between the thermal barrier layer and the substrate; the substrate being a nickel-based superalloy; the substrate having a radially outwardly extending flange; and a combined thickness of the abradable layer and the thermal barrier layer having a fore-to-aft increase of at least 10% over a span at least 10% of the longitudinal span of the coating.

A further embodiment may additionally and/or alternatively include a method for manufacturing the blade outer airseal. The method comprises thermal spray of the thermal barrier layer and the abradable layer in a single chamber.

A further embodiment may additionally and/or alternatively include thermal spray of a transition layer.

A further embodiment may additionally and/or alternatively include a method for using the blade outer airseal. The method comprises: installing the blade outer airseal on a turbine engine; and running the turbine engine so that blade tips rub the abradable coating.

Another aspect of the disclosure involves a blade outer airseal having a body comprising: an inner diameter (ID) surface; an outer diameter (OD) surface; a leading end; and a trailing end. The airseal body has a metallic substrate and a coating system atop the substrate along at least a portion of the inner diameter surface. At least over a first area of the inner diameter surface, the coating system comprises an abradable layer and a thermal barrier layer between the abradable layer and the substrate and the thermal barrier layer has a thickness profile rearwardly biased relative to a thickness profile of the abradable layer.

A further embodiment may additionally and/or alternatively include one or more of: the thermal barrier coating having a rearwardly increasing thickness profile; the thermal barrier coating having a progressively rearwardly increasing thickness profile; and the thermal barrier coating being localized to a rear portion of a span of the abradable coating.

A further embodiment may additionally and/or alternatively include the substrate having a radially outwardly extending flange and the bias being along a portion of the substrate aft of the flange.

Another aspect of the disclosure involves a gas turbine engine compressor section comprising: a stage of blades having Ni-based substrates; a blade outer airseal. The blade outer airseal comprises: an inner diameter (ID) surface; an outer diameter (OD) surface facing tips of the blades; a leading end; and a trailing end. The airseal comprises a metallic substrate and a coating system atop the substrate along at least a portion of the inner diameter surface. At least over a first area of the inner diameter surface, the coating system comprises an abradable layer and a thermal barrier layer between the abradable layer and the substrate.

A further embodiment may additionally and/or alternatively include the substrate having a circumferential channel along the ID face; the abradable coating is substantially localized to the channel; and the thermal barrier coating extends beyond the channel.

A further embodiment may additionally and/or alternatively include the thermal barrier coating extending onto the leading end and the trailing end.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
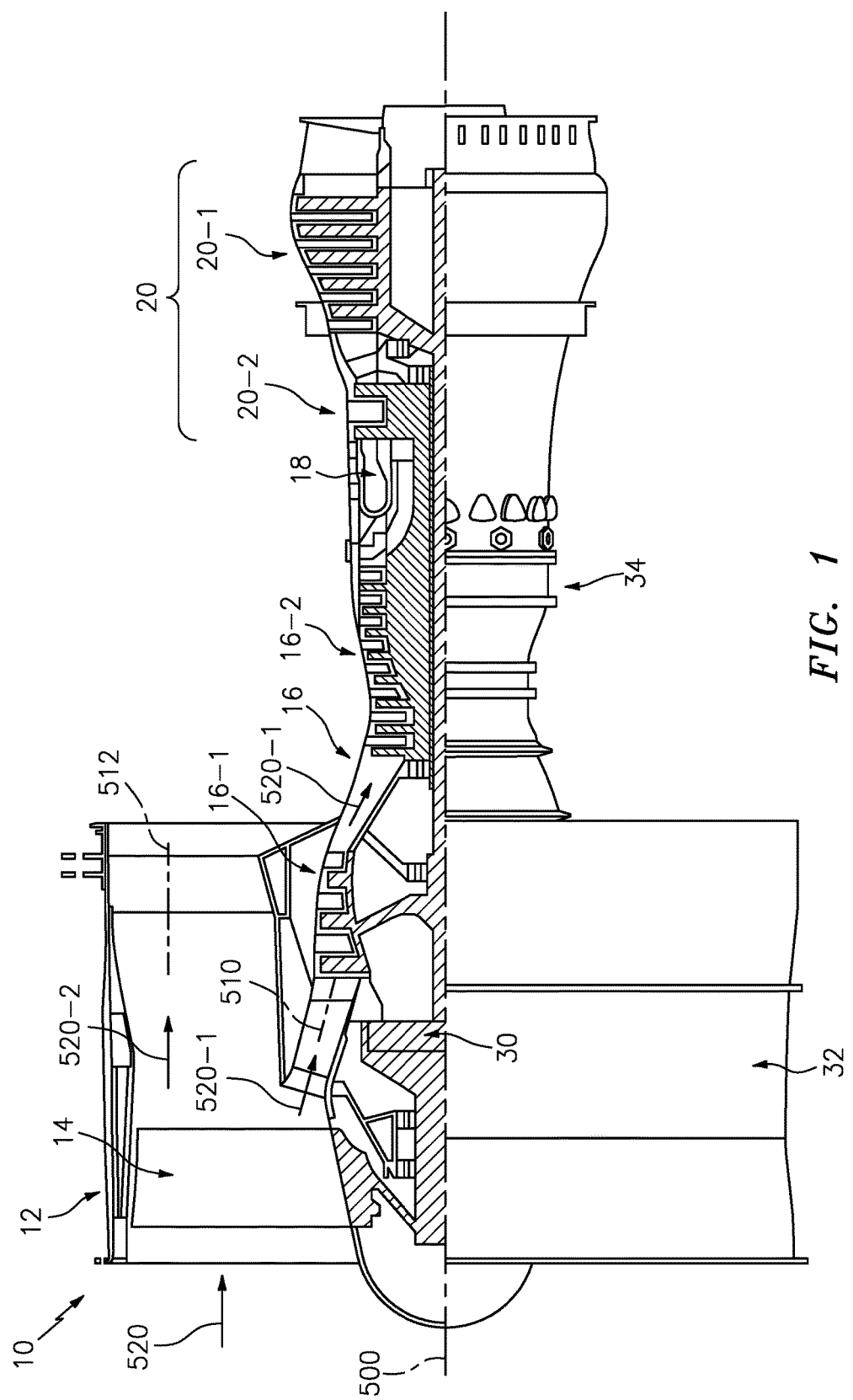
FIG. 1 is a schematic axial half cross-sectional view of an embodiment of a gas turbine engine.

FIG. 1 is a schematic illustration of a gas turbine engine 10. The illustrated engine is a turbofan used to produce propulsive thrust in aerospace applications. Broadly, relevant gas turbine engines may also include turbojets, turboprops, industrial gas turbines (IGT), and the like. For purposes of illustration, outer aerodynamic cases are not shown. The gas turbine engine has a central longitudinal axis 500. The gas turbine engine generally has a fan section 12 through which an inlet flow 520 of ambient air is propelled by a fan 14, a compressor 16 for pressurizing the air 520-1 received from the fan 14, and a combustor 18 wherein the compressed air is mixed with fuel and ignited for generating combustion gases. The inlet flow 520 splits into a first or core portion 520-1 flowing along the gaspath (core flowpath) 510 and a bypass portion 520-2 flowing along a bypass flowpath 512. The illustrated engine 10 and gross features of its airseals (discussed below) are based on a particular configuration shown in the aforementioned '494 application.

Nevertheless, the teachings herein may be applied to other general engine configurations and other general airseal configurations.

The gas turbine engine 10 further comprises a turbine 20 for extracting energy from the combustion gases. Fuel is injected into the combustor 18 of the gas turbine engine 10 for mixing with the compressed air from the compressor 16 and ignition of the resultant mixture. The fan 14, compressor 16, combustor 18, and turbine 20 are typically all concentric about a common central longitudinal axis 500 of the gas turbine engine 10.

Depending upon the implementation, the compressor and turbine may each contain multiple sections. Each section includes one or more stages of rotor blades interspersed with one or more stages of stator vanes. The exemplary configuration has two compressor sections and two turbine sections. From upstream to downstream along the gaspath 510, these include a low pressure compressor section (LPC) 16-1, a high pressure compressor section (HPC) 16-2, a high pressure turbine section (HPT) 20-2, and a low pressure turbine section (LPT) 20-1. The exemplary rotors of the LPC and LPT are formed to rotate as a first unit or low pressure spool with the LPT driving the LPC. Similarly, the HPT and HPC rotors are arranged as a high pressure spool. The fan may be driven by the low pressure spool either directly or via a reduction gearbox 30. Other configurations are, however, known. Whereas illustrated in the context of compressors 16, one skilled in the art will readily appreciate that the present disclosure may be utilized with respect to turbines (e.g., an LPT where temperatures are relatively low).

Figure 2:
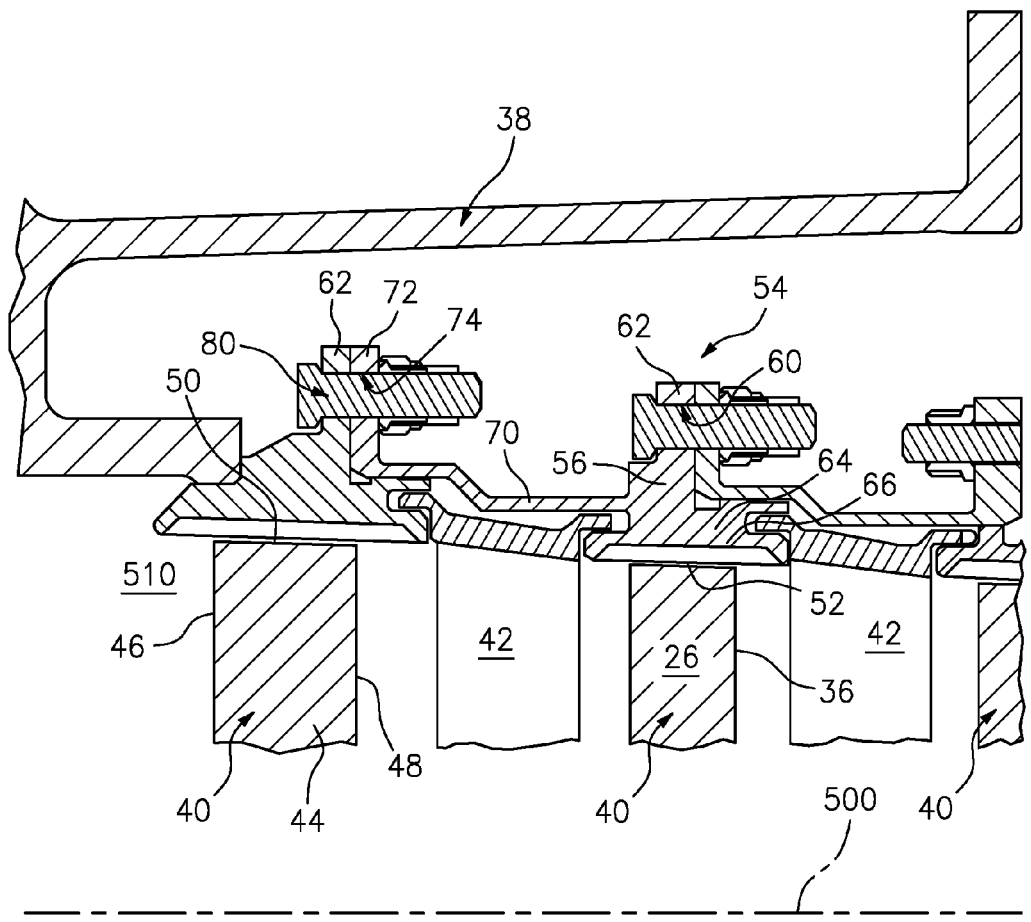
FIG. 2 is a schematic axial cross-sectional view of an embodiment of a compressor of the gas turbine engine.

The exemplary engine comprises a fan case 32 and a core case 34. The core case has sections along the corresponding sections of the engine core. FIG. 2 shows an HPC case section 38 of the core case 34 along the HPC.

FIG. 2 schematically shows several stages of blades 40 of the HPC rotor. Interspersed with the blades are stages of stator vanes 42. Each blade has an airfoil 44 having a leading edge 46, a trailing edge 48, a pressure side (not shown) and a suction side (not shown) and extends from an inboard end to an outboard tip 50. The tip 50 is in close facing proximity to an inner diameter (ID) surface 52 of an outer airseal 54. Each exemplary outer airseal 54 includes a metallic substrate 56 and an abradable coating system (or rub strip) 58 (FIG. 2A) forming the ID surface 52 along an ID surface of the substrate.

The exemplary outer airseal 54 is formed as a generally full annulus (e.g., locally interrupted by mounting features such as a circumferential array of holes 60 in a radially outwardly extending flange 62). In cross-section, the exemplary outer airseals 54 comprise an inboard body or band 64 comprising a body or band 66 of the substrate and the rub strip 58 inboard thereof. The flange 62 extends radially outward from the band 66. For mounting the exemplary airseals, at a forward end of the flange 62, an axial collar portion 70 extends forwardly to terminate in a radially outward extending flange 72. The flange 72 has mounting holes 74 complementary to mounting holes of an adjacent mating flange. FIG. 2 shows several airseal stages associated with respective blade stages. Each flange 72 may mate to a flange 62 of the next forward airseal and be secured thereto via fasteners (e.g., threaded fasteners) 80.

Figure 2A:
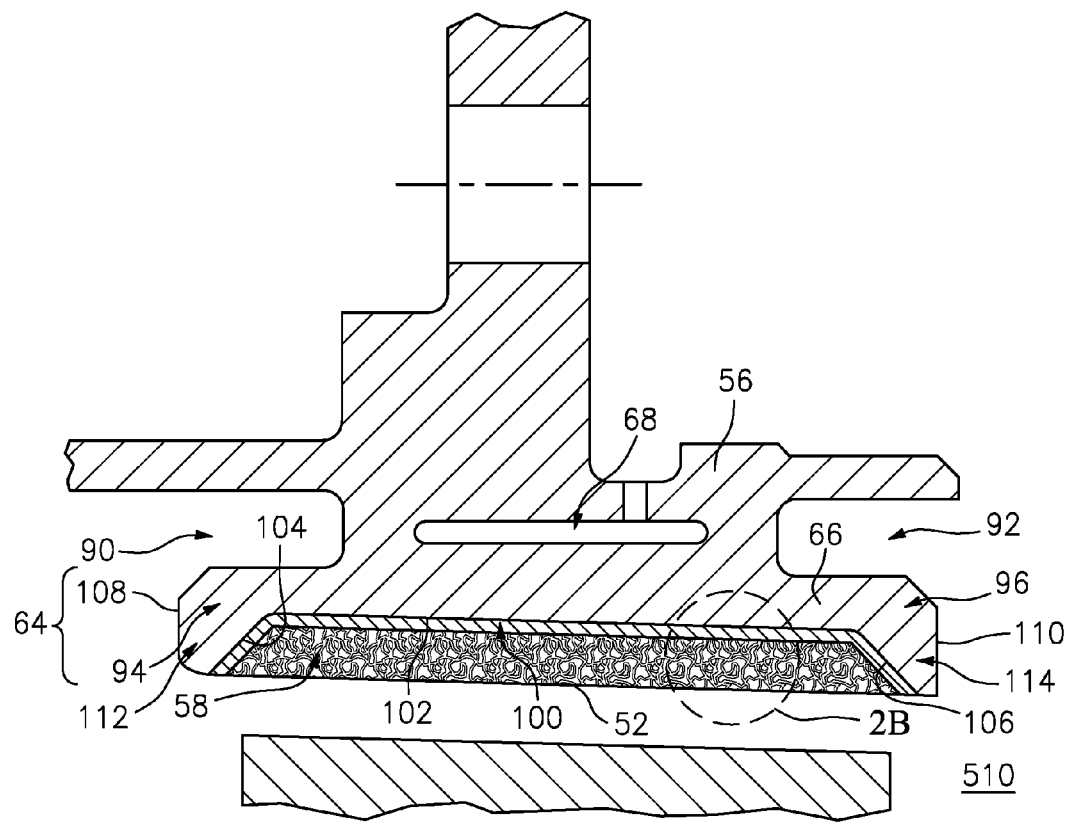
FIG. 2A is a schematic axial cross-sectional view of an embodiment of an outer airseal of the compressor of the a gas turbine engine at detail 2A of FIG. 2.

FIG. 2A further shows respective fore and aft channels 90 and 92 outboard of corresponding cantilevered portions 94 and 96 of the substrate band 66 for capturing associated flanges of adjacent stages of stator segments.

As is discussed in aforementioned '494 application, heat transfer to the flanges 62 and 72 is a source of problems.

Steps that have been undertaken to address this include: making the flange 62 appropriately massive; and adding cooling features 68 such as those in the '494 application. The massiveness of the flange 62 functions in several ways. First, for a given amount of heat transfer to the band 66, and thus from the band to the flange 62, the temperature increase experienced by the flange will be smaller for more massive flanges. Second, a more massive flange 62 can more easily mechanically resist expansion caused by heating of the band 66 due to greater strength of the more massive flange.

As is discussed below, however, the rub strip 58 may be configured to influence heat transfer from the gaspath 510 ultimately to the flange 62. In various implementations, use of the rub strip to assist in thermal management may allow reduced massiveness of the flange and/or may allow reduction or elimination of cooling features such as those shown in the '494 application. Nevertheless, the thermal management associated with the rub strip 58 may be used in conjunction with such other features.

The exemplary rub strip 58 (FIG. 2A) is located in an inwardly (radially) open annular channel 100 or well in the substrate band portion 66. The channel has a surface comprising a base surface 102 and respective fore and aft surfaces 104 and 106.

The band 66 extends from a forward rim 108 to an aft rim 110 and has forwardmost and aftmost portions 112 and 114 respectively forward of and behind the channel 100.

Figure 2B:
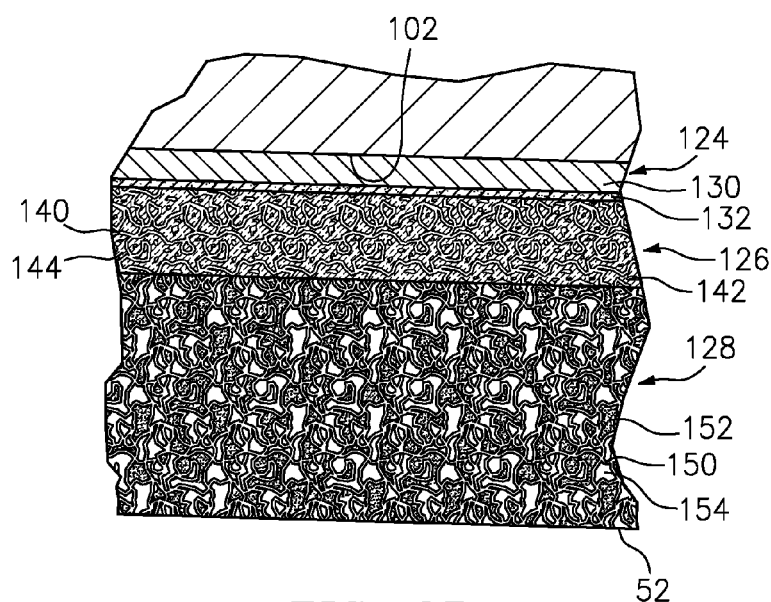
FIG. 2B is a coating cross section at detail 2B of FIG. 2A.

The rub strip 58 may be formed with multiple layers. A base layer 124 (FIG. 2B) may be a bondcoat atop an inner diameter (ID) surface portion of the substrate band formed by the channel surfaces (102, 104, 106). A thermal barrier coating (TBC) layer 126 is at least locally atop the bondcoat. An abradable layer 128 is at least locally atop the TBC layer. The abradable layer 128 may represent any appropriate prior art or future abradable layer composition. The TBC layer 126 may be selected for insulative purposes to limit or tailor the flow of heat from the gaspath 510 to the substrate 56.

The exemplary bondcoat 124 includes a base layer 130 and a thermally grown oxide (TGO) layer 132. The base layer and TGO layer may originally be deposited as a single precursor layer. There may be diffusion with the substrate. The TGO layer may reflect oxidation of original material of the precursor. Exemplary base layer thicknesses are 10-400 micrometers, more narrowly 20-200 micrometers. Exemplary TGO layer thicknesses are 0.05-1 micrometers, more narrowly 0.1-0.5 micrometers. Alternative bondcoats include diffusion aluminides.

An exemplary coating process includes preparing the substrate (e.g., by cleaning and surface treating). A precursor of the bondcoat is applied. An exemplary application is of an MCrAlY, more particularly a NiCoCrAlY material. An exemplary MCrAlY is Ni23Co17Cr12A10.5Y. An exemplary application is via a spray (e.g., thermal spray) from a powder source. Exemplary application is via air plasma spray (APS). Alternative methods include a high-velocity oxy-fuel (HVOF) process, a high-velocity air-fuel (HVAF) process, a low pressure plasma spray (LPPS) process, or a wire-arc process. An exemplary application is to a thickness of 0.003-0.010 inch, (76-254 micrometers) more broadly 0.001-0.015 inch (25-381 micrometers).

After the application, the precursor may be diffused. An exemplary diffusion is via heating (e.g., to at least 1900° F. (1038° C.) for a duration of at least 4 hours) in vacuum or nonreactive (e.g., argon) atmosphere. The exemplary diffusion may create a metallurgical bond between the bondcoat and the substrate. Alternatively diffusion steps may occur after applying the TBC, if at all.

After application of the bondcoat precursor, if any, the substrate may be transferred to a coating apparatus for applying the TBC 126 and abradable layer 128. An exemplary application is via a spray (e.g., a thermal spray) from a powder source. Exemplary application is via air plasma spray (APS). Alternative methods include a high-velocity oxy-fuel (HVOF) process, a high-velocity air-fuel (HVOF) process, a low pressure plasma spray (LPPS) process, or a wire-arc process. Alternative techniques involve consolidated and sintered powder including pressing, tape casting, and vibratory consolidation. These may include direct write, DMLS and laser fusing 3D printing with or without binders. As an alternative to in situ formation directly on the substrate (optionally with a bond coat or other layer(s)) preformed layers may be brazed or adhesively bonded or otherwise to the substrate (or to an intervening layer).

An exemplary TBC 126 comprises a single ceramic-containing layer of a single nominal composition. Multi-layer and graded composition embodiments are also possible. An exemplary abradable layer 128 is a metal matrix composite. An exemplary metal matrix composite comprises the metal (alloy) matrix, a solid lubricant, and porosity.

The exemplary TBC 126 contains metal (alloy) 140 and porosity 142 in addition to the ceramic 144. The exemplary by volume content of metal in the TBC is less than in the abradable layer.

Within the TBC 126, an exemplary ratio of ceramic 144 to metal 140 by volume is between 3:1 and 50:1, more particularly between 5:1 and 20:1 or between 5:1 and 10:1 or an exemplary about 7:1. An exemplary remainder (e.g., porosity plus solid lubricant in some embodiments as discussed below) is up to 70% by volume, more particularly 2% to 70%, or 5% to 60% or 20% to 50% or 30% to 45% or an exemplary about 40%.

The ceramic 144 (e.g., a stabilized zirconia such as a yttria-stabilized zirconia (YSZ), particularly 7YSZ) contributes to the composite low conductivity and strength. The metal 140 greatly increases toughness and spallation resistance. Porosity (if any) created inherently by the application (e.g., spray) process and/or via addition of a fugitive filler material further reduces conductivity, but also contributes to reduced elastic modulus, coating stress and tendency to spall (i.e., both the metallic content and porosity increase the possible thickness of the TBC 126 and therefore maximum thermal resistance of the system). At some point with increasing porosity the TBC gets weak and allows abradable spallation. To mitigate this, the TBC may be selected to be stronger than the abradable.

The exemplary abradable layer 128 contains metal (alloy) 150 and a solid lubricant 152. It may further contain porosity 154.

A very broad range of relative contents of solid lubricant and porosity are possible in the abradable layer 128. Within the abradable layer 128, an exemplary by volume content of the metal is 20% to 50%, more particularly 25% to 40%, or an exemplary about 35%. An exemplary porosity is up to 70% by volume, more particularly 1.0% to 70%, or 1.0% to 40%, or 1.0% to 30%; or 10% to 30% or 15% to 30% or an exemplary about 20% in embodiments that have significant porosity. Other embodiments may target low porosity (e.g., 0% to 10% or 1% to 6% or 2% to 4%) with high solid lubricant content. Exemplary solid lubricant 152 volumetric contents are at least 5% or at least 20% or an exemplary 20% to 60% in higher porosity layers and 60% to 80% or 70% to 80% or 75% to 80% in the low porosity embodiments.

In the low porosity abradable layer embodiments, porosity may be lower in the abradable layer than in the TBC (substantially lower in embodiments where the TBC or a main portion thereof does not include any of the solid lubricant but has only the ceramic, metal, and porosity). In either situation, the abradable layer would have lower cohesive bond strength than the TBC. In embodiments where the cohesive strength of the abradable layer is equal to or higher than that of the TBC, the risk of sheet spallation from the TBC would be unacceptable.

Exemplary solid lubricants include hexagonal boron nitride (hBN) (e.g., commercially pure hBN or a mixture such as 10 wt % bentonite agglomerated hBN). The selection of porosity to hBN ratio may involve both engine operational requirements and economics. HBN is relatively expensive compared with porosity formers. Whereas high porosity coating versions will be lower cost to produce, the resultant roughness and porosity of the coating may cause greater aerodynamic losses than those with relatively lower porosity and higher hBN content. In order to improve the economics of low porosity, high hBN coatings, a binder material such as bentonite may be used to improve the deposition efficiency of the hBN.

In many aerospace applications the benefit of improved aerodynamic efficiency greatly outweighs the added manufacturing cost of using high hBN content as opposed to porosity formers. For example, the erosion resistance and abradability of a coating containing 28% by volume metal matrix may be desirable for a given application. If the coating were made with hBN content of about 70% and porosity of about 2%, the resultant coating would have low gas permeability and low surface roughness compared with a similar coating of high porosity. That high porosity coating would for example be 28% metal matrix plus 72% porosity after a fugitive constituent such as methylmethacrylate is burned out. A turbine compressor stage with the high hBN, relatively dense coating, would have about 1% greater compressor stage efficiency than the porous version. This 1% efficiency difference provides thousands of dollars' worth of fuel savings over the life of an engine. In contrast, the added manufacturing cost may be on the order of a few hundred dollars. In contrast, in the land based industrial gas turbine (IGT) industry, turbine diameter is relatively large. As diameter increases, power increases faster as a function of diameter increase than do the surface roughness aerodynamic losses around the outer diameter of the turbine. Thus, the efficiency of the larger diameter IGT turbines is less sensitive to the surface aerodynamic losses. With the high emphasis on low initial cost in the IGT industry, the less expensive high porosity version of the abrdable is likely to be chosen.

Even in the high porosity coating versions it is desirable to include at least some solid lubricant phase, on the order of 5% by volume. The solid lubricant contributes to particle liberation during rub events. In contrast, with no solid lubricant, there is an increased tendency for metal smearing that creates a fully dense metal layer on the abradable. When this occurs, blade wear increases and abradability is diminished.

In comparison with fused and crushed pure hBN, hBN agglomerated with bentonite binder is used more efficiently in the thermal spray process. The pure hBN material is fused and crushed with irregular particle shape. The pure material also does not have a melting point under atmospheric conditions. This means that not only is the powder difficult to feed uniformly to the plasma spray process, but it does not melt to facilitate adhesion and deposition in the form of a coating. With the addition of bentonite to hBN (5% to 15% of the hBN weight), a slurry of the mixture can be made that can be spray dried into agglomerates that are substantially round and well suited to the powder feed methods used in thermal spray. These agglomerates may be further heat treated to calcine the bentonite to drive off the water portion of the hydrated molecules that makeup the bentonite. This thermal treatment helps to make the agglomerates more durable to handling and reduces gas evolution during the heating of the thermal spray process. During the thermal spray process, most desirably air plasma spray, the bentonite component of the agglomerates melts and facilitates adhesion to form the coating. The resultant deposition process for the agglomerated hBN is about three times as efficient as for the pure crushed hBN.

An exemplary ratio of abradable layer volumetric metal content to TBC volumetric metal content is between 1.5:1 and 15:1, more particularly between 2:1 and 10:1, or an exemplary 5:1. In one group of examples, the metal (alloy) of the TBC is the same as that of the abradable. An exemplary alloy family is Cu—Ni—Cr—Al alloys. A particular alloy Cu40Ni7Cr7Al. This and other candidate alloys are disclosed in U.S. Patent Application 62/312406 filed Mar. 23, 2016, and entitled "Outer Airseal Abradable Rub Strip", the disclosure of which is incorporated by reference herein in its entirety as if set forth at length.

Use of the same alloy across both layers has advantages of minimizing chances for galvanic corrosion and limiting differential thermal expansion and may otherwise aid interlayer adhesion. Alternatives involve MCrAlY alloys.

In another group of examples, the metal (alloy) of the TBC is the same as that of the bondcoat (optionally different from that of the abradable layer). Similar advantages attend this as having the same alloy across the TBC and abradable layers.

An exemplary application process involves a thermal spray process (e.g., air plasma spray) in a single spray chamber to apply the TBC 126 and abradable layer 128. In one group of examples: a first premixed powder contains powders of the metal 140, ceramic 144, and a fugitive (e.g., polymeric such as an aromatic crystalline polyester or methyl methacrylate); and a second premixed powder contains powders of the metal 150, solid lubricant 154, and a fugitive (e.g., polymeric such as an aromatic crystalline polyester or methyl methacrylate). The spray torch may be switched between sources of the first powder and second powder to sequentially apply the TBC 126 and abradable layer 128. Post-spray bakeout may remove the fugitive to leave the porosity 142 and 154.

An exemplary thickness of the TBC 126 is 0.010 inch to 0.080 inch (0.25 millimeter to 2.0 millimeter), more particularly, 0.020 inch to 0.060 inch (0.51 millimeter to 1.5 millimeter). An exemplary thickness of the abradable layer 128 is 0.010 inch (0.25 millimeter) to 0.16 inch (4.1 millimeters) or 0.020 inch (0.51 millimeter) to 0.10 inch (2.5 millimeters) or about 0.040 inch (1.0 millimeter) to 0.080 inch (2.0 millimeters). Depthwise transition zones may be present. For example, there may be a brief interval in a spray process when both the first powder source and second powder source are active.

A further variation involves a first source comprising the ceramic and optionally a fugitive and the second source comprising the metal, solid lubricant, and optionally fugitive. The first source and second source together are used to spray the TBC; the second source alone is used to spray the abradable layer. There may be a graded transition as flow from the first source is decreased and/or the second source is increased. As mentioned above, this allows some of the porosity found in a TBC lacking the solid lubricant to be filled with the solid lubricant. Providing the graded transition or allowing the TBC to include the solid lubricant is not believed to have performance advantages but may have manufacturing economy advantages.

As noted above, abradable coating systems having a barrier layer for fire protection are known for use with blade stages having titanium based blades in order to address concerns particular to titanium fires. Blade stages having nickel-based superalloy blade substrates would not present such fire concern. However, use of the coatings discussed above for thermal management may still apply to stages having titanium-based blades. However, the lower temperatures to which such blades are exposed mean that the thermal management may be of lower importance than it is with stages having nickel-based superalloy blades.

A number of variations may attend thermal management use of a TBC layer. Some of these might also be relevant to stages having titanium-based blade substrates. Possible examples include having a non-uniform thickness distribution of the TBC layer in order to tailor thermal expansion response of the outer airseal. For example, a greater thickness of TBC could be present in areas where one wished a greater reduction in temperature and heat transfer.

A particularly relevant variation is an axial variation. Temperature may increase from upstream-to-downstream along the airseal generally and along the portion of the airseal swept by the blade tip (i.e., the portion of the airseal from the axial position of the forwardmost portion of the tip to that of the aftmost portion of the tip). It may be thus appropriate to rearwardly bias the thickness distribution of the TBC layer along some portion of the outer airseal. Thus, the TBC layer thickness will be greater toward an aft extremity of this portion than toward a forward extremity. Some variations may involve continuously progressive increase along at least a portion. This absolute and/or relative TBC thickness increase may be associated with a corresponding absolute and/or relative decrease in the thickness of the abradable layer. Other variations may include a stepwise variation. That might be appropriate in a reengineering or remanufacturing situation where the geometry of a baseline substrate is preserved. If one alters substrate geometry, additional options are available such as having a uniform thickness of the abradable but a longitudinally varying thickness of the TBC. Thus, one might have an inner diameter of the substrate that slightly increases from fore to aft relative to a baseline substrate to allow for a corresponding fore-to-aft TBC thickness increase and a corresponding fore-to-aft thickness increase of the combined TBC and abradable or combined TBC, abradable, and bondcoat.

Figure 3:
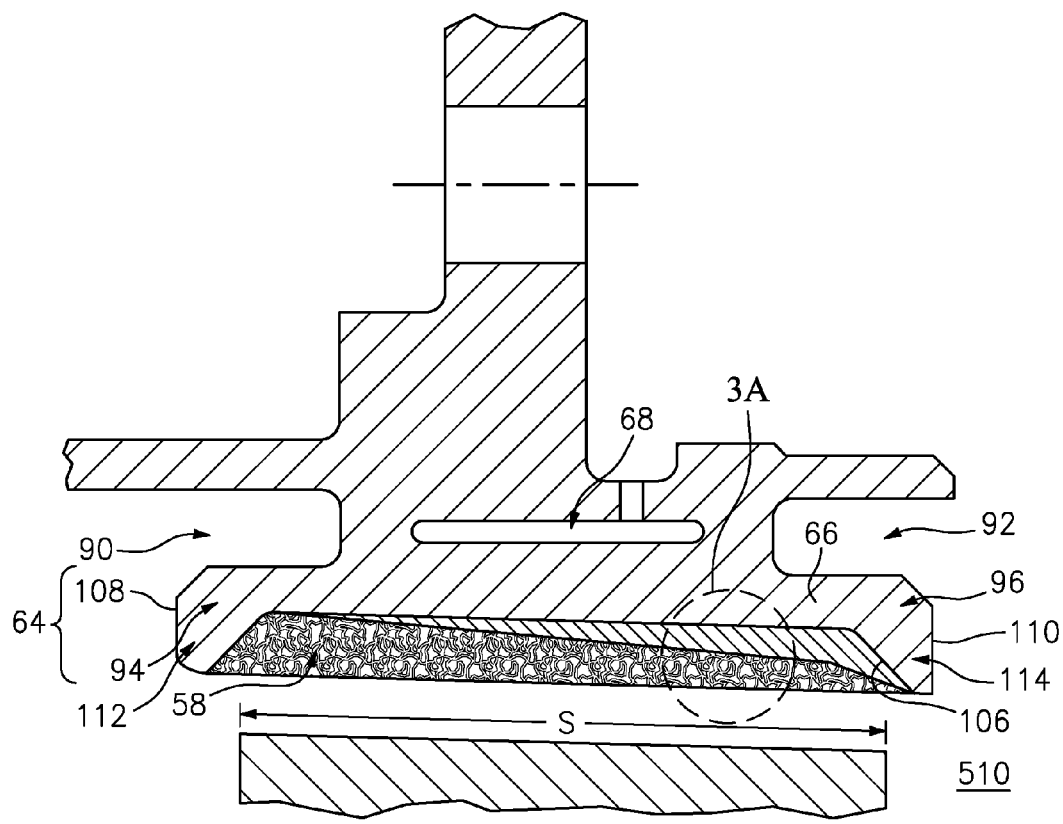
FIG. 3 is a schematic axial cross-sectional view of a second embodiment of an outer airseal.
Figure 3A:
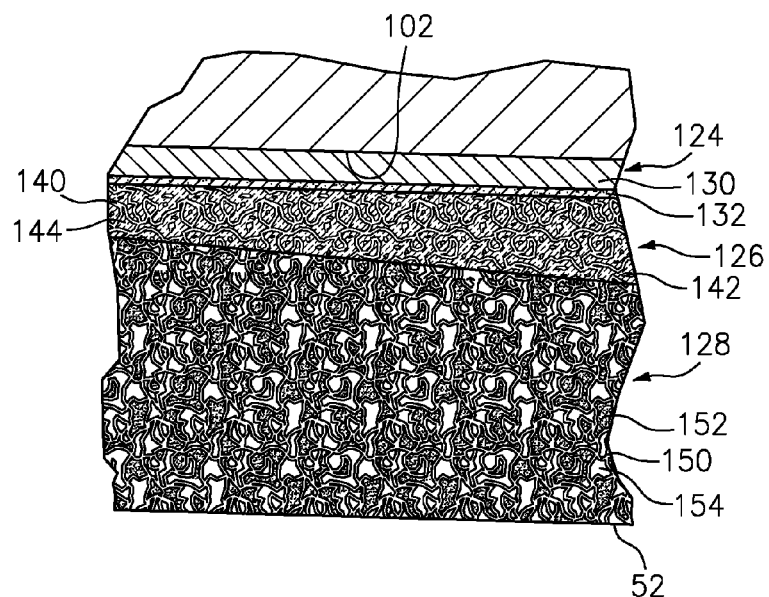
FIG. 3A is a coating cross section at detail 3A of FIG. 3.

For example, the general increase in temperature from upstream to downstream may cause a rear portion of the band 66 to receive more heat than a forward portion and thus more greatly expand clearance along the rear portion. This may also induce a risk of other axially asymmetric deformations being passed to the flange. Biasing the insulative effect rearward may even out heating of the band portion and thus even out its radial expansion and thus avoid asymmetric deformations. FIGS. 3 and 3A show a continuously progressively increasing thickness of the TBC 126 over at least a portion of a blade-swept span S. The exemplary progressive increase is at least 50% (or at least 80%) over a length of at least 30% (or at least 40%) of S.

Figure 4:
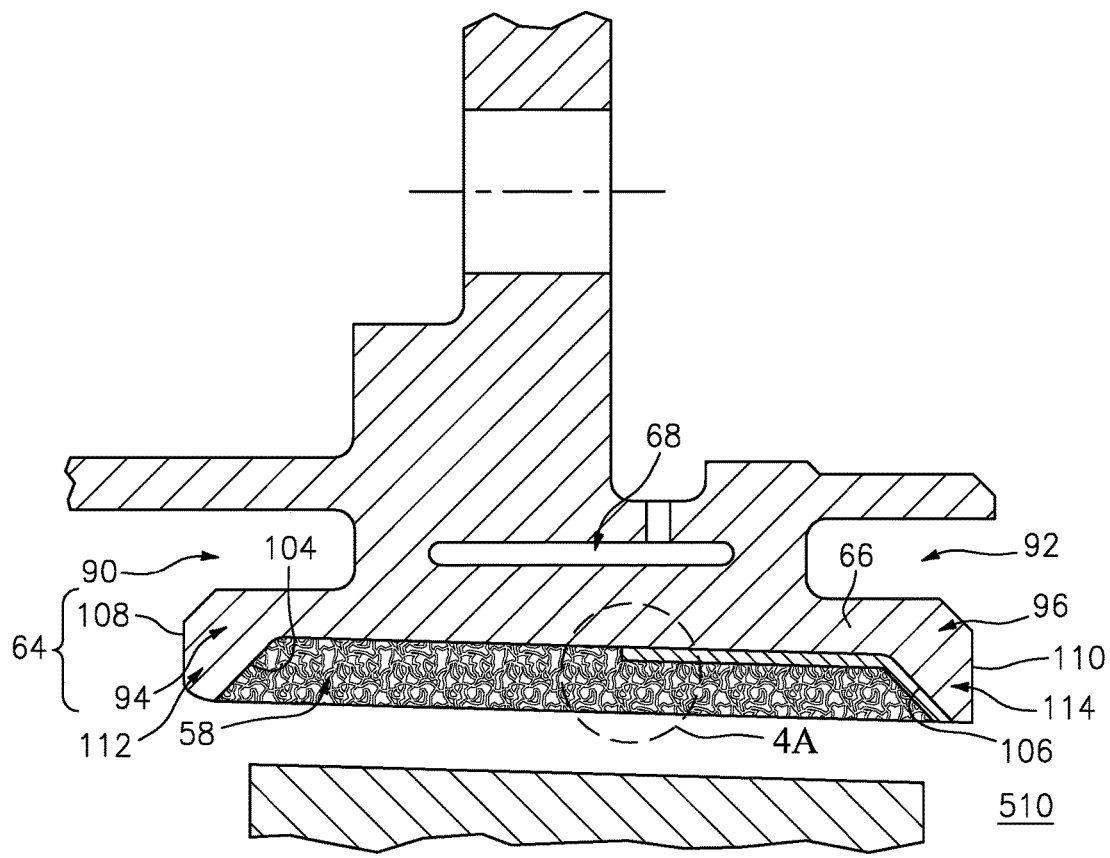
FIG. 4 is a schematic axial cross-sectional view of a third embodiment of an outer airseal.
Figure 4A:
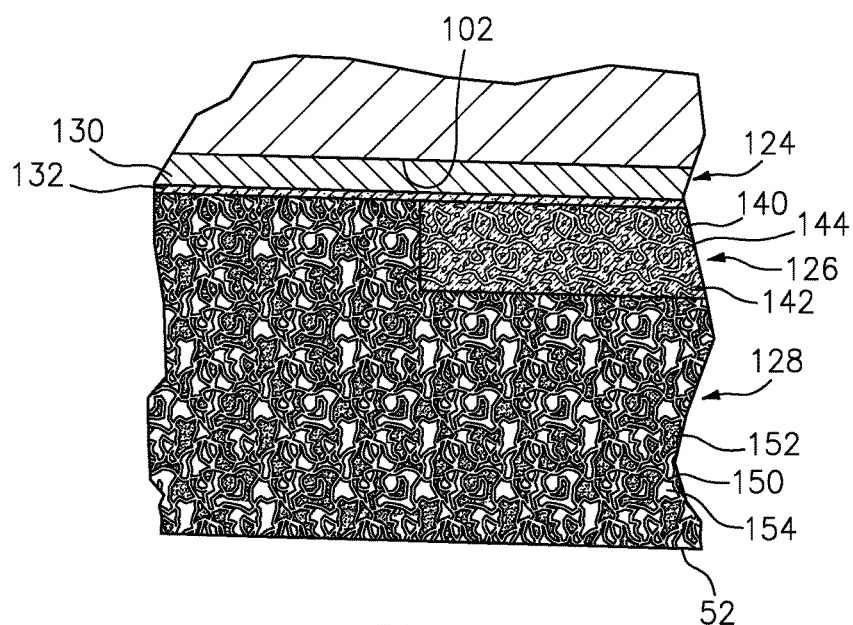
FIG. 4A is a coating cross section at detail 4A of FIG. 4.

An example of a stepwise variation (FIGS. 4 and 4A) includes applying the TBC layer over only a portion of the area of the substrate swept by the blade. As noted above, this may be an aft portion (subportion or subspan) of the portion (axial span) swept by the blade. Masking may be used to create an abrupt transition between the area of the bondcoat lacking TBC and the portion having the TBC 126. Alternatively, control of the spray torch may leave a short transition region.

Figure 5:
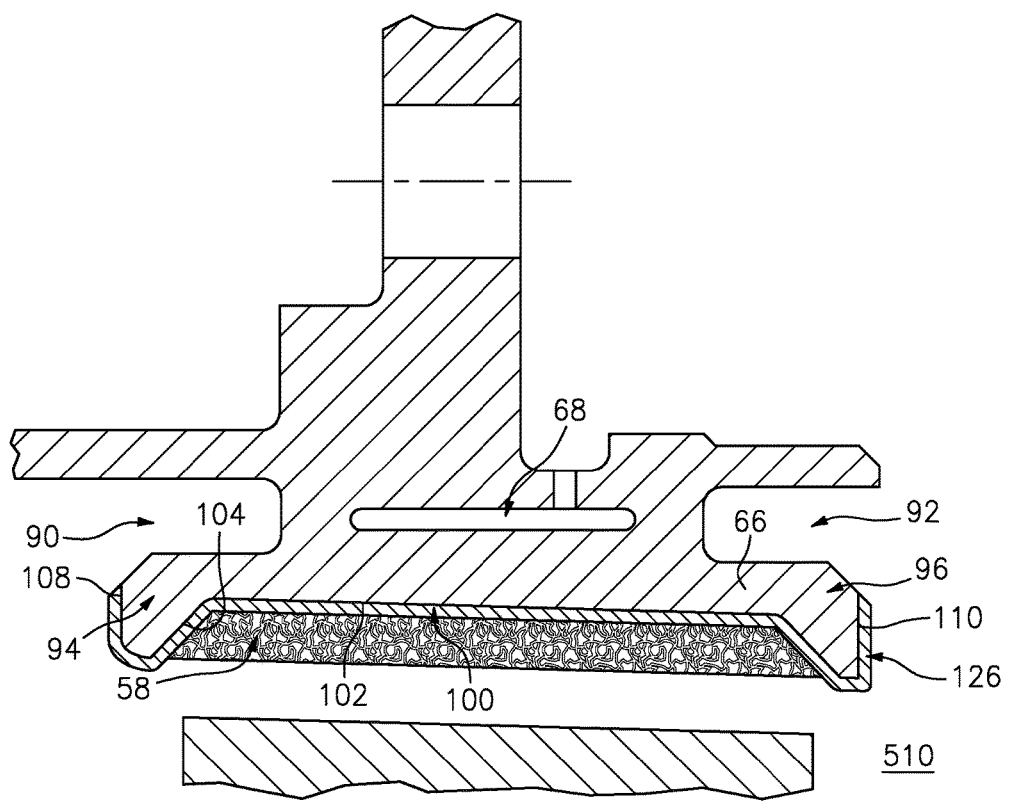
FIG. 5 is a schematic axial cross-sectional view of a fourth embodiment of an outer airseal.

In a further variation (optionally combined with other variations), the TBC 126 extends axially beyond the abradable layer 128. FIG. 5 shows an example where the TBC 126 wraps around the substrate rims 108 and 110. This protects those regions from heating and thus may be used to mitigate thermal expansion generally and differential thermal expansion particularly.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A blade outer airseal having:
   a body comprising:
      an inner diameter surface;
      an outer diameter surface;
      a leading end;
      a trailing end;
      a metallic substrate; and
      a coating system atop the substrate along at least a portion of the inner diameter surface,
   wherein:
      at least over a first area of the inner diameter surface, the coating system comprises an abradable layer and a thermal barrier layer between the abradable layer and the substrate;
      over a span of the abradable layer, a relative thickness of the abradable layer to the thermal barrier layer decreases from fore to aft; and
      the thermal barrier layer comprises a ceramic and metallic phases within the ceramic.

2. The blade outer airseal of claim 1 wherein:
   the abradable layer comprises a metal matrix and a solid lubricant.

3. The blade outer airseal of claim 1 wherein:
   the abradable layer comprises a metal phase volumetric content greater than a metal phase volumetric content of the thermal barrier layer.

4. The blade outer airseal of claim 1 wherein:
   the abradable layer comprises a metal matrix of a first alloy; and
   the thermal barrier layer metallic phases are of the first alloy.

5. The blade outer airseal of claim 1 wherein:
   the abradable layer has a lower strength than the thermal barrier layer.

6. The blade outer airseal of claim 1 wherein:
   the abradable layer has a greater thickness than the thermal barrier layer.

7. The blade outer airseal of claim 1 wherein:
the thermal barrier layer has a stepwise thickness increase.
8. The blade outer airseal of claim 1 wherein:
the thermal barrier layer has a higher volumetric ceramic content than a does the abradable layer, if any.
9. The blade outer airseal of claim 1 wherein one or more of:
the coating system has a bondcoat between the thermal barrier layer and the substrate;
the substrate is a nickel-based superalloy;
the substrate has a radially outwardly extending flange; and
a combined thickness of the abradable layer and the thermal barrier layer has a fore-to-aft increase of at least 10% over a span at least 10% of the longitudinal span of the coating.
10. A method for manufacturing the blade outer airseal of claim 1, the method comprising:
thermal spray of the thermal barrier layer and the abradable layer in a single chamber.
11. The method of claim 10 further comprising:
thermal spray of a transition layer.
12. A method for using the blade outer airseal of claim 1, the method comprising:
installing the blade outer airseal on a turbine engine; and
running the turbine engine so that blade tips rub the abradable coating.
13. A blade outer airseal having:
a body comprising:
an inner diameter surface;
an outer diameter surface;
a leading end;
a trailing end;
a metallic substrate; and
a coating system atop the substrate along at least a portion of the inner diameter surface
wherein:
at least over a first area of the inner diameter surface, the coating system comprises an abradable layer and a thermal barrier layer between the abradable layer and the substrate;
the thermal barrier layer comprises a ceramic and metallic phases within the ceramic; and
the thermal barrier layer extends axially beyond the abradable layer.
14. A blade outer airseal having:
a body comprising:
an inner diameter surface;
an outer diameter surface;
a leading end;
a trailing end;
a metallic substrate; and
a coating system atop the substrate along at least a portion of the inner diameter surface,
wherein:
at least over a first area of the inner diameter surface, the coating system comprises an abradable layer and a thermal barrier layer between the abradable layer and the substrate; and
the thermal barrier layer has a thickness profile rearwardly biased relative to a thickness profile of the abradable layer.

15. The blade outer airseal of claim 14 wherein one or more of:
the thermal barrier coating has a rearwardly increasing thickness profile;
the thermal barrier coating has a progressively rearwardly increasing thickness profile; and
the thermal barrier coating is localized to a rear portion of a span of the abradable coating.
16. The blade outer airseal of claim 14 wherein:
the substrate has a radially outwardly extending flange; and
the bias is along a portion of the substrate aft of the flange.
17. A gas turbine engine compressor section comprising:
a stage of blades having Ni-based substrates;
a blade outer airseal comprising:
an inner diameter surface;
an outer diameter surface facing tips of the blades;
a leading end;
a trailing end;
a metallic substrate; and
a coating system atop the substrate along at least a portion of the inner diameter surface,
wherein:
at least over a first area of the inner diameter surface, the coating system comprises an abradable layer and a thermal barrier layer between the abradable layer and the substrate.
18. The gas turbine engine compressor section of claim 17 wherein:
the substrate has a circumferential channel along the inner diameter face;
the abradable coating is substantially localized to the channel; and
the thermal barrier coating extends beyond the channel.
19. The gas turbine engine compressor section of claim 18 wherein:
the thermal barrier coating extends onto the leading end and the trailing end.
20. A blade outer airseal having:
a body comprising:
an inner diameter surface;
an outer diameter surface;
a leading end;
a trailing end;
a metallic substrate; and
a coating system atop the substrate along at least a portion of the inner diameter surface,
wherein:
at least over a first area of the inner diameter surface, the coating system comprises an abradable layer and a thermal barrier layer between the abradable layer and the substrate;
the thermal barrier layer comprises a ceramic and metallic phases within the ceramic; and
one or more of:
the coating system has a bondcoat between the thermal barrier layer and the substrate;
the substrate is a nickel-based superalloy;
the substrate has a radially outwardly extending flange; and
a combined thickness of the abradable layer and the thermal barrier layer has a fore-to-aft increase of at least 10% over a span at least 10% of the longitudinal span of the coating.

* * * * *